(12) United States Patent
Sukegawa

(10) Patent No.: US 8,234,453 B2
(45) Date of Patent: Jul. 31, 2012

(54) PROCESSOR HAVING A CACHE MEMORY WHICH IS COMPRISED OF A PLURALITY OF LARGE SCALE INTEGRATION

(75) Inventor: Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 12/068,700

(22) Filed: Feb. 11, 2008

(65) Prior Publication Data

US 2009/0172288 A1 Jul. 2, 2009

(30) Foreign Application Priority Data

Dec. 27, 2007 (JP) ................................. 2007-337083

(51) Int. Cl.
  *G06F 12/00* (2006.01)
  *G06F 13/00* (2006.01)
  *G06F 13/28* (2006.01)
(52) U.S. Cl. ......... 711/128; 711/119; 711/141; 438/109
(58) Field of Classification Search .................... 711/128
  See application file for complete search history.

(56) References Cited

U.S. PATENT DOCUMENTS

| 5,448,711 | A | | 9/1995 | Yarkoni et al. | |
|---|---|---|---|---|---|
| 5,617,347 | A | | 4/1997 | Lauritzen | |
| 6,104,628 | A | * | 8/2000 | Sugibayashi | 365/51 |
| 6,330,643 | B1 | * | 12/2001 | Arimilli et al. | 711/141 |
| 2003/0082959 | A1 | * | 5/2003 | Boswell et al. | 439/894 |
| 2005/0276015 | A1 | * | 12/2005 | Wong | 361/687 |
| 2007/0168620 | A1 | * | 7/2007 | Leonard et al. | 711/141 |

FOREIGN PATENT DOCUMENTS

| JP | 62-055743 | 3/1987 |
|---|---|---|
| JP | 05-108484 | 4/1993 |
| JP | 08-272688 | 10/1996 |
| JP | 09-232503 | 9/1997 |
| JP | 2000-068460 | 8/1998 |

OTHER PUBLICATIONS

Feihui Li et al., "Design and Management of 3D Chip Multiprocessors Using Network-in-Memory", 2006 IEEE, http://www.cs.utah.edu/classes/cs7940-010-rajeev/sum06/papers/3disca06.pdf , 12 pages.

* cited by examiner

*Primary Examiner* — Brian Peugh
*Assistant Examiner* — Prasith Thammavong
(74) *Attorney, Agent, or Firm* — Stites & Harbison, PLLC; Juan Carlos A. Marquez, Esq

(57) ABSTRACT

To provide an easy way to constitute a processor from a plurality of LSIs, the processor includes: a first LSI containing a processor; a second LSI having a cache memory; and information transmission paths connecting the first LSI to a plurality of the second LSIs, in which the first LSI contains an address information issuing unit which broadcasts, to the second LSIs, via the information transmission paths, address information of data, the second LSI includes: a partial address information storing unit which stores a part of address information; a partial data storing unit which stores data that is associated with the address information; and a comparison unit which compares the address information broadcast with the address information stored in the partial address information storing unit to judge whether a cache hit occurs, and the comparison units of the plurality of the second LSIs are connected to the information transmission paths.

11 Claims, 7 Drawing Sheets

PROCESSOR HAVING A CACHE MEMORY WHICH IS COMPRISED OF A PLURALITY OF LARGE SCALE INTEGRATION

CLAIM OF PRIORITY

The present application claims priority from Japanese application P2007-337083 filed on Dec. 27, 2007, the content of which is hereby incorporated by reference into this application.

BACKGROUND OF THE INVENTION

This invention relates to a structure of a cache memory of a processor, and more particularly, to a technique of cache memory construction that includes stacking a plurality of large scale integrations (LSI).

Device miniaturization owing to the recent advancement in semiconductor manufacture technology has made it possible to integrate numerous transistors on one die, and now a few or many processor cores can be integrated on one die or in one package. Multi-core processors having a plurality of processor cores, for example, have an exponentially improved computing ability.

Meanwhile, the transfer rate of DRAMs widely employed as a main memory which stores data read and written by a processor has not kept up with the aforementioned improvement in processing ability of processors, thus causing a large latency when the processor accesses the main memory. A technique widely employed as a countermeasure in recent processors is to lower the frequency of direct access to the main memory from a processor core by mounting a Level 2 (L2) or Level 3 (L3) cache to the same die or the same package as the processor core (for example, JP 2000-68460 A or the IBM's Power series).

Another popular technique of reducing the latency in access to the main memory from the processor core is to mount a memory controller onto the die (on-die memory controllers).

As described above, increasing the capacity of the L2 or L3 cache makes the processor core access the main memory less frequently, but the on-die L2 or L3 cache has a problem in that the yield of processor products is lowered in proportion to the increase in area of the die due to the added L2 or L3 cache.

As a solution to this problem, a technique has been proposed which divides LSIs constituting a processor into layers and stacks the LSIs on top of one another to make them into a single package (an example is found in an online research paper titled "Design and Management of 3D Chip Multiprocessors Using Network in Memory", written by Feihui Li, Chrysostomos Nicopoulos, Thomas Richardson, Yuan Xie, Vijaykrishnan Narayanan, and Mahmut Kandemir, Dept. of CSE, The Pennsylvania State University. According to the technique of this document (hereinafter referred to as Non-patent Document 1), an electrode that pierces the LSIs divided into layers in the sectional direction (called a through electrode) connects the stacked LSIs to one another. A processor core and an L2 cache memory are provided in each of the LSIs divided into layers, and the layers are stacked together to constitute one processor.

SUMMARY OF THE INVENTION

The miniaturization of semiconductor devices has lately made attempts to increase on-die processor cores in number, including proposed techniques in which four to eight processor cores, or more, are mounted onto one die. The disjunction between the transfer rate of the main memory and the processing ability of the processor will therefore become even greater, and it is also expected that the increase in capacity of cache memories is accelerated in order to reduce the disjunction.

If a processor core and an L2 cache are to be placed together on a single layer as in Non-patent Document 1, the L2 cache capacity can be increased by stacking a plurality of layers.

However, in the above example of related art, a plurality of L2 caches are arranged in a decentralized manner on one layer, with each of the L2 caches constituting one cache node. This means that, in the entire processor package, many cache nodes are scattered among the layers.

The above example of related art therefore needs to arrange many comparators, which compare a tag with an index during cache access, and read/write circuits, which read and write data, according to the number of the nodes, thus causing a problem of complicating the LSI circuit structure on each layer. Another problem of the above example of related art, where a comparator and a read/write circuit are provided for each cache node, is that the areas of these circuits cut into the capacity of caches mounted onto one LSI.

Still another problem of the above example of related art is that placing a processor core and an L2 cache both on the same LSI layer makes it difficult to increase or decrease the cache memory capacity alone. Specifically, in the above example of related art, increasing or decreasing the cache memory capacity to suit the use of the processor by simply increasing or decreasing the LSI layers in number increases or decreases the number of processor cores as well, and it is difficult to increase or decrease the cache memory capacity while keeping the processor core count constant.

This invention has been made in view of the problems described above, and it is therefore an object of this invention to provide an easy way to constitute a processor from a plurality of LSIs, which has various cache memory capacities with a simple circuit structure.

A processor according to this invention includes: a first LSI containing a processor that performs computing processing; a second LSI having a cache memory which stores data and address information; and information transmission paths connecting the first LSI to a plurality of the second LSIs, in which the first LSI contains an address information issuing unit which broadcasts, to the plurality of the second LSIs, via the information transmission paths, address information of data to which access is requested by the processor, the second LSI includes: a partial address information storing unit which stores a part of address information of an entire cache memory storage area; a partial data storing unit which stores data that is associated with the address information stored in the partial address information storing unit; and a comparison unit which compares the address information broadcast to the information transmission paths with the address information stored in the partial address information storing unit to judge which one of a cache hit and a cache miss occurs, and the first LSI and the comparison unit of each of the plurality of the second LSIs are connected to the information transmission paths.

Further, the first LSI and the plurality of the second LSIs are stacked to constitute a processor.

Further, the plurality of the second LSIs are stacked on a bottom surface of the first LSI, and the information transmission paths include through electrodes formed in the plurality of the second LSIs.

Further, the first LSI and the plurality of the second LSIs are linked via an interposer.

This invention can thus increase or decrease with ease the cache memory capacity by changing the number of the second LSIs. Also, cache access can be quickened while keeping the circuit structure simple by using a through electrode to connect the LSIs.

DETAILED DESCRIPTION OF THE PREFERRED EMBODIMENTS

Hereinafter, an embodiment of this invention will be described below with reference to the accompanying drawings.

Figure 1:
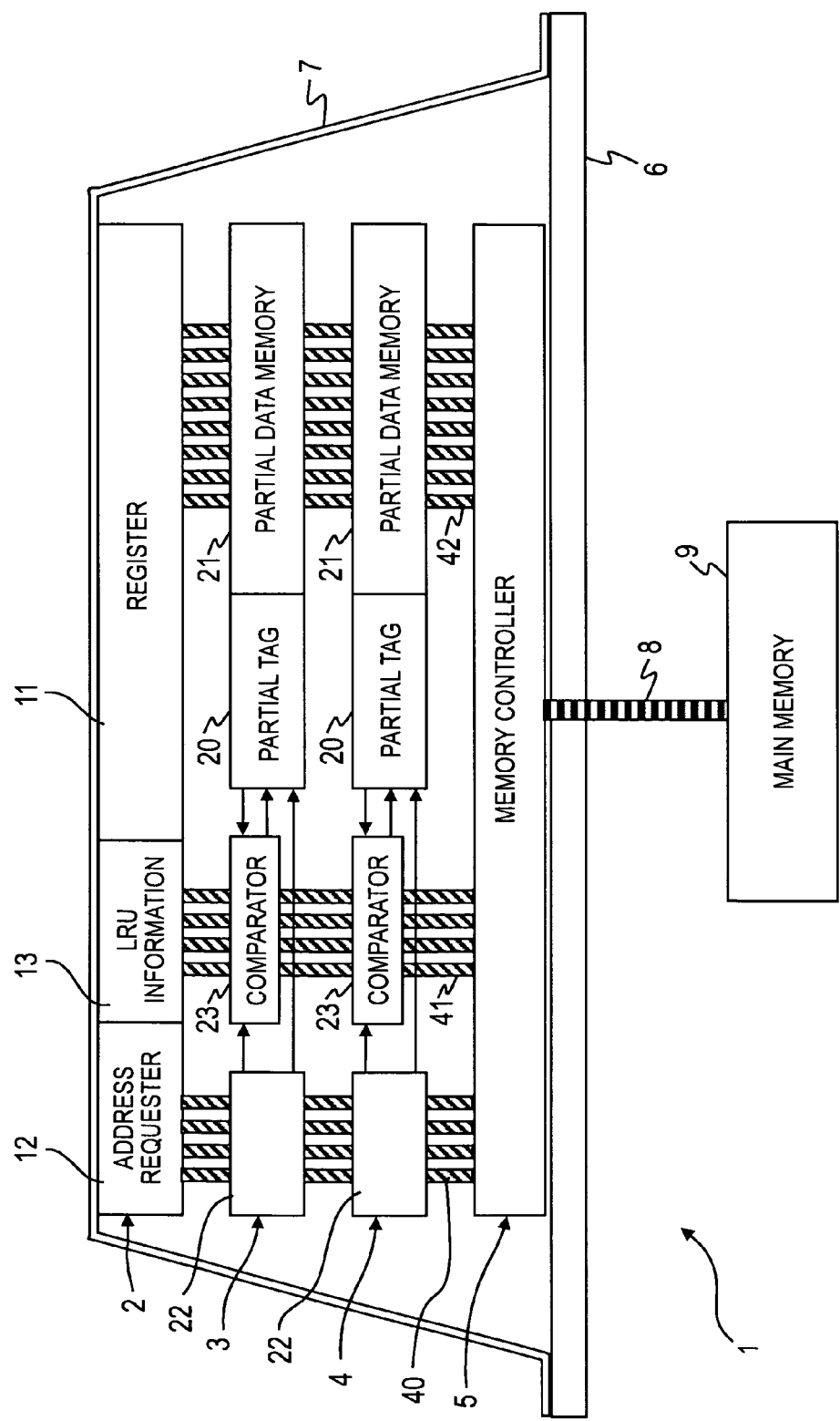
FIG. 1 is a schematic diagram in a sectional direction of a processor to which this invention is applied according to a first embodiment.

FIG. 1 is a schematic diagram in a sectional direction of a processor 1 to which this invention is applied according to a first embodiment of this invention.

The processor 1 is formed of a plurality of large scale integration (LSI) chips stacked on a substrate 6. The stacked LSI chips are, from bottom (the substrate 6) to top, a memory controller LSI 5, a cache LSI-B 4, a cache LSI-A 3, and a CPU-LSI 2. The top surface of the CPU-LSI 2 is covered with a heat spreader 7, and the bottom surface of the memory controller LSI 5 is supported by the substrate 6. The LSI chips are connected with one another in the top-bottom direction in the drawing via through electrodes 40, 41, and 42, which are formed in the cache LSI-A and the cache LSI-B as will be described later. The rim of the heat spreader 7 is bonded to the substrate 6. The LSIs 2 to 5 are formed as plate-like chips.

Figure 3:
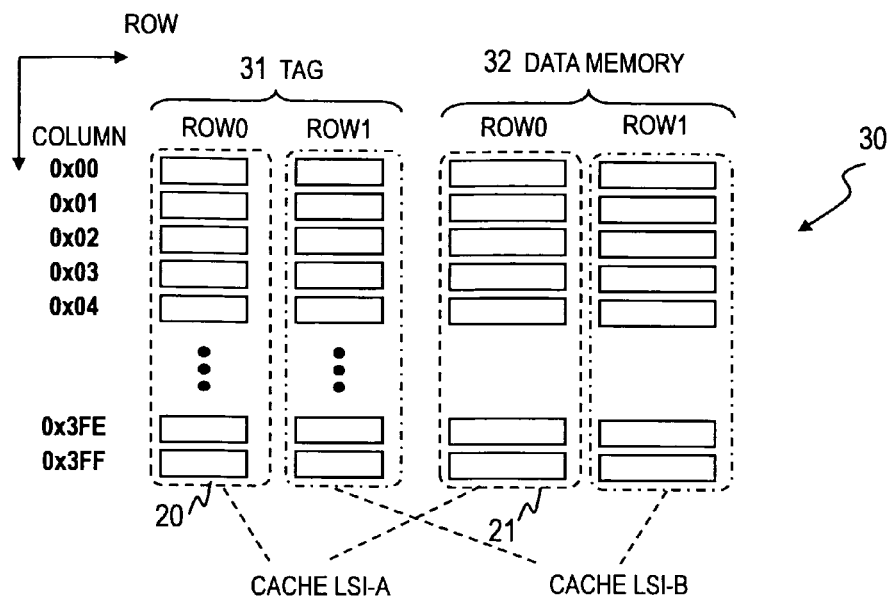
FIG. 3 is a block diagram showing storage areas of a cache memory according to the first embodiment.

The cache LSI-A 3 (hereinafter, cache LSI-A) and the cache LSI-B 4 (hereinafter, cache LSI-B) together constitute one cache memory 30 as shown in FIG. 3.

The memory controller LSI 5 of FIG. 1 is connected to an external main memory 9 via a memory bus 8 of the substrate 6. The memory controller LSI 5 accesses the main memory 9 and the cache memory 30 to read and write data in response to a request from the CPU-LSI 2.

Figure 2:
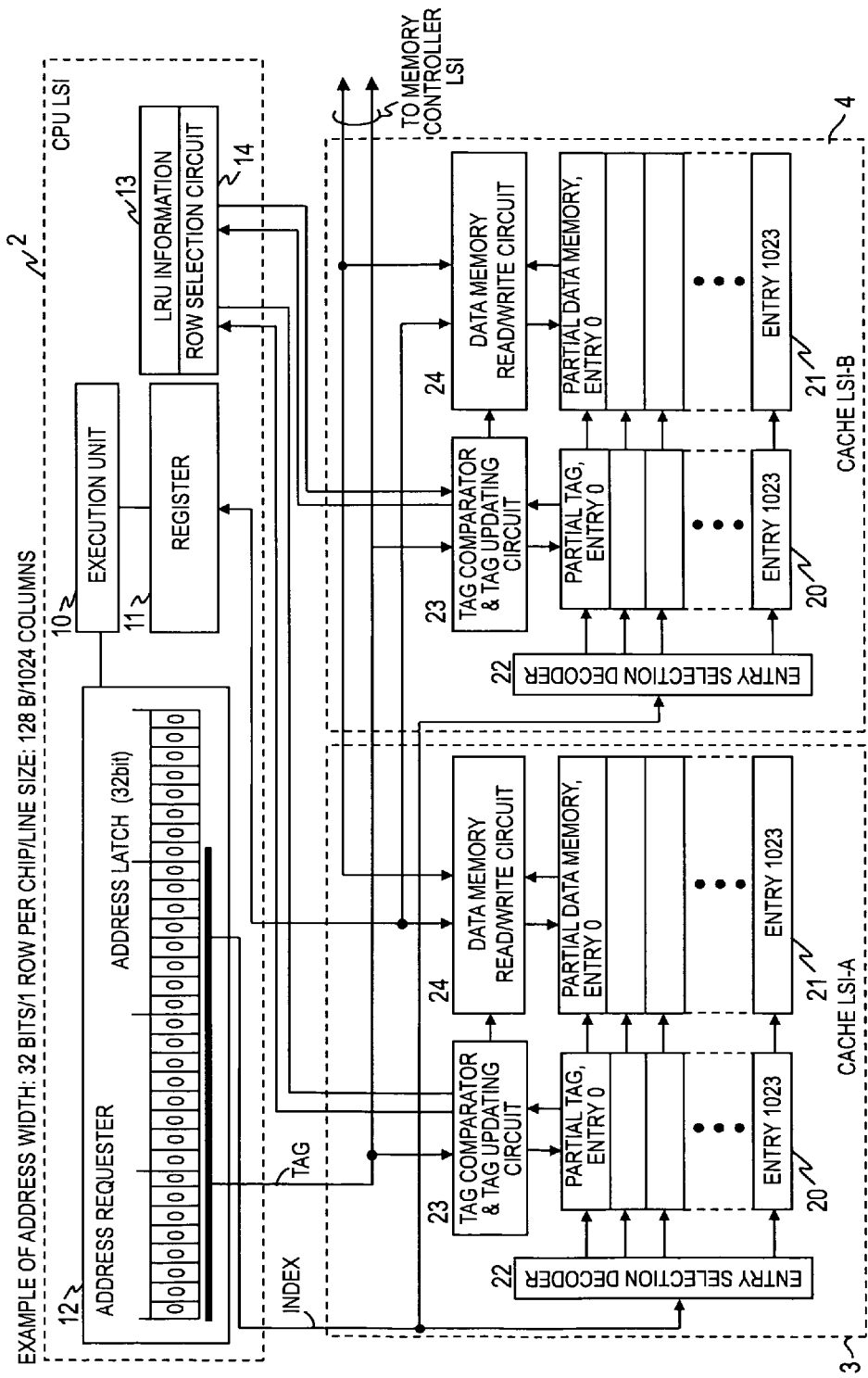
FIG. 2 is a block diagram showing important parts of the processor according to the first embodiment.

The CPU-LSI 2 includes, as shown in FIG. 2, an execution unit 10, which performs computing processing, a register 11, which stores data and flags, an address requester 12, which stores addresses requested by the execution unit 10 and searches the cache memory, a least recently used (LRU) information storing unit 13, which stores information for identifying which data stored in the cache memory 30 has been used (has been a hit) last and which data has not (the information will hereinafter be referred to as LRU information), and a row selection circuit 14, which identifies a row direction in the cache memory 30 constituted of rows and columns. The LRU information is for identifying, when cache line are refilled or replaced, which of cache lines in a plurality of rows has not been a hit or has not been used for a longer time than any other of the cache lines, and can be set by a known method.

The row selection circuit 14 contains a replaced line determining circuit which determines a cache line that is to be replaced when a cache miss occurs.

The LRU information storing unit 13 may contain, in addition to the LRU information which indicates the utilization state of each cache line (whether a cache line has been a hit or not, and an order in which cache lines have been used), a valid bit indicating whether data of a cache line is valid or invalid and information indicating the state of a cache line, for example, whether data of a cache line remains unchanged from when read out of the memory or has been rewritten in some places.

<Circuit Structure of the Cache>

The first embodiment shows an example in which, as illustrated in FIG. 2, the address width is 32 bits, one row of cache line is provided per cache LSI, and the cache line has 1024 columns. In this example, the cache memory 30 formed of two cache LSIs, the cache LSI-A and the cache LSI-B, as shown in FIGS. 1 and 3 has a two-way set associative structure. An associativity N of the cache LSI-A and the cache LSI-B is 1 and a cache LSI count M is 2 in the example of FIG. 3. The maximum associativity is N×M=2. The cache memory 30 makes an L2 cache, for example, of the CPU-LSI 2.

As shown in FIG. 3, the cache memory 30 contains two different areas: a tag 31 which stores management information such as an address and a data memory 32 which stores data on a cache line basis. The tag 31 and the data memory 32 are formed of partial tags 20 and partial data memories 21, respectively. The partial tag 20 of the cache LSI-A and the partial tag 20 of the cache LSI-B are different in the row direction, and the partial data memory 21 of the cache LSI-A and the partial data memory 21 of the cache LSI-B are different in the row direction. In short, information stored in the cache memory 30 is distributed between the cache LSI-A and the cache LSI-B, which are independent of each other in the row (way) direction. Therefore, the partial tag 20 of the cache LSI-A and the partial tag 20 of the cache LSI-B each store address information in the row direction of a part of the entire storage area of the cache memory 30, and the partial data memory 21 of the cache LSI-A stores data of cache lines that are associated with the address information in the partial tag 20 of the cache LSI-A whereas the partial data memory 21 of the cache LSI-B stores data of cache lines that are associated with the address information in the partial tag 20 of the cache LSI-B. Address information and data are thus stored in the cache LSI-A and in the cache LSI-B in a dispersed manner.

The cache LSI-A and the cache LSI-B have the same structure, and the following description takes the cache LSI-A as an example. In the cache LSI-A of FIG. 2, the partial data memory 21 which stores data of the main memory 9 on a cache line basis and the partial tag 20 which stores tags (address information) of the respective cache lines constitute a storage area of the cache memory 30.

The cache LSI-A also has an entry selection decoder 22, which receives an index from the address requester 12 of the CPU-LSI 2 and chooses an entry of a tag from the partial tag 20 based on the received index, a tag comparator 23, which compares a tag sent from the address requester 12 with tags stored in the partial tag 20 to identify matching entries, and a data memory read/write circuit 24, which reads and writes data in the partial data memory 21.

In this example, address information issued by the address requester 12 to the cache LSI-A and the cache LSI-B uses the top fifteen bits as a tag and the sixteenth to twenty-fifth bits from the top as an index when the address width is 32 bits and the line size is 128 bytes as shown in FIG. 2.

The tag comparator 23 contains a circuit that updates tags (a tag updating circuit) when cache lines are refilled in addition to comparing tags. The data memory read/write circuit 24 reads data of the hit partial data memory 21 and transfers the read data to the register 11 of the CPU-LSI 2 when the CPU-LSI 2 accesses the cache for data read. When the CPU-LSI 2 accesses the cache for data write, the data memory read/write circuit 24 writes data read out of the register 11 of the CPU-LSI 2 in the hit partial data memory 21.

The cache access operation of the CPU-LSI 2 is the same as in the above example of related art and known n-way set associative structures, and will not be described in detail here.

<Physical Structure of the Processor>

Described next is the physical structure of the processor 1 in which a plurality of LSI chips are stacked. In FIG. 1, the components of the CPU-LSI 2 are arranged such that the address requester 12 is on the leftmost side of the drawing, with the LRU information storing unit 13 and the register 11 following the address requester 12 in this order. The LRU information storing unit 13 contains the row selection circuit 14 shown in FIG. 2.

The cache LSI-A and the cache LSI-B place their respective entry selection decoders 22 right under the address requester 12, tag comparators 23 right under the LRU information storing unit 13, and partial data memories 21 right under the register 11. The partial tags 20 of the cache LSI-A and the cache LSI-B are placed between their respective tag comparators 23 and partial data memories 21.

The cache LSI-A and cache LSI-B constituting the processor 1 are provided with the through electrodes 40, 41, and 42, which connect the top and bottom of the processor 1.

The through electrode 40 is formed in the entry selection decoders 22 to function as an information transmission path that broadcasts address information (a tag and an index) from the address requester 12 to the cache LSI-A, the cache LSI-B, and the memory controller LSI 5. The through electrode 40 is therefore formed of as many signal lines as the total bit count of a tag and an index which are formed in a direction that pierces the top surfaces and bottom surfaces of the cache LSI-A and the cache LSI-B.

The through electrode 41 is formed in the tag comparators 23. The through electrode 41 is formed of signal lines, formed in a direction that pierces the top surfaces and bottom surfaces of the cache LSI-A and the cache LSI-B, to transfer judgment signals, which indicate a cache hit or a cache miss, from the tag comparators 23 and to transfer selection signals from the row selection circuit 14. However, the cache LSI-A and the cache LSI-B use different signal lines. In the case where the judgment signals are 1-bit signals and the selection signals are 1-bit signals, for example, two signal lines per cache LSI chip are sufficient, and four signal lines are provided as shown in FIG. 1 where two cache LSI chips, the cache LSI-A and the cache LSI-B, are employed. Ground signals are transferred through a not-shown through electrode.

In the case where an increase or decrease in number of cache LSIs is expected, the through electrode 41 for the judgment signals and the selection signals is prepared to be capable of accommodating the maximum number of cache LSIs that can be mounted. The through electrode 41 with eight signal lines is provided in the cache LSI-A and the cache LSI-B in advance, in the processor 1 which uses four cache LSI chips at maximum.

The through electrode 42 is formed in the partial data memories 21 to function as an information transmission path that broadcasts data among the register 11, the cache LSI-A, the cache LSI-B, and the memory controller LSI 5. The through electrode 42 is therefore formed of as many signal lines as the bit count of the data, which are formed in a direction that pierces the top surfaces and bottom surfaces of the cache LSI-A and the cache LSI-B. In the case where the broadcast data is 32-bit data, the through electrode 42 has 32 signal lines.

On the bottom surface of the CPU-LSI 2 (the side facing the cache LSI-A), an electrode that sends a tag and an index is placed in the location of the address requester 12, an electrode (a bump or the like) that sends and receives the judgment signals and the selection signals is placed in the location of the LRU information storing unit 13 (the row selection circuit 14), and an electrode that sends and receives data is placed in the location of the register 11. The top surface of the memory controller LSI 5 (the side facing the cache LSI-B) is provided with an electrode (a bump or the like) that is connected to the through electrodes 41, 42, and 43 on the bottom surface of the cache LSI-B. Control signals from the CPU-LSI 2 to the memory controller LSI 5 and other signals are sent and received via a not-shown through electrode or the like.

On the top surface of the cache LSI-A connected to the bottom surface of the CPU-LSI 2, the through electrode 40 is connected to the electrode of the address requester 12, the through electrode 41 is connected to the electrode of the LRU information storing unit 13 (the row selection circuit 14), and the through electrode 42 is connected to the electrode of the register 11.

On the bottom surface of the cache LSI-A, the through electrodes 40, 41, and 42 are connected to the through electrodes 40, 41, and 42 on the top surface of the cache LSI-B, respectively. On the bottom surface of the cache LSI-B, the through electrodes 40, 41, and 42 are connected to the electrodes provided on the top surface of the memory controller LSI 5.

Upon cache access from the CPU-LSI 2 for data read, a tag and an index are broadcast from the address requester 12 via the through electrode 40 to the cache LSI-A, the cache LSI-B, and the memory controller LSI 5. When the tag comparator 23 of the cache LSI-A (or -B) judges that there is a cache hit, the data memory read/write circuit 24 shown in FIG. 2 sends the data in question of the partial data memory 21 to the through electrode 42, and writes the data in the register 11. In the case of cache access for data write, the register 11 sends data to be written to the through electrode 42, and the data memory read/write circuit 24 of the cache LSI-A or the cache LSI-B where a cache hit has occurred writes the data in a relevant cache line.

When there is a cache miss in the cache LSI-A or the cache LSI-B, on the other hand, the memory controller LSI 5 detects the cache miss from the through electrode 41 and accesses the main memory 9 using the tag and index broadcast by the address requester 12, and obtains data of a cache line where the cache miss is detected.

The memory controller LSI 5 broadcasts the data obtained from the main memory 9 to the through electrode 42, thereby refilling the cache LSI-A or the cache LSI-B and writing in the register 11 at the same time.

Low latency communication among a plurality of LSI chips is accomplished by thus broadcasting address information (a tag and an index) from the address requester 12, the judgment signals from the tag comparators 23, the selection signals from the row selection circuit 14, and data via the through electrodes 40 to 42.

Further, the capacity of the cache memory 30 in the processor 1 can be increased with ease by inserting a cache LSI that has the same structure as that of the cache LSI-A and the cache LSI-B between the cache LSI-B and the memory controller LSI 5 (or between the CPU-LSI 2 and the cache LSI-A).

In the cache memory 30 of the first embodiment, the partial tag 20 storing tags and the partial data memory 21 are distributed between the cache LSI-A and the cache LSI-B while management information such as the LRU information is managed by the CPU-LSI 2 in a centralized manner, and the cache LSI-A and the cache LSI-B are independent of each other in the row direction of the cache memory 30. An added cache LSI therefore can enlarge the cache memory 30 in the row direction, thereby increasing the "way count" as in n-way set associative cache. For example, adding two cache LSI chips between the bottom surface of the cache LSI-B and the top surface of the memory controller LSI 5 expands the cache memory 30 to a four-way set associative cache. With the per-cache LSI associativity N=2 and the cache LSI count M=4, the maximum associativity is 4. Removing a cache LSI on the other hand makes the cache memory 30 smaller in capacity with a lower "way count".

Also, since tags are stored in the cache LSI-A and the cache LSI-B instead of placing large-capacity tag information in the CPU-LSI 2, the processor 1 can secure tags of a size as large as the cache capacity, which is determined by the number of cache LSIs.

The LRU information, which is smaller in capacity than tags and, when managed in a centralized manner, speeds up the process of identifying which cache line is available for refilling, is placed in the CPU-LSI 2.

In packaging the cache memory 30 of the processor 1 three-dimensionally by stacking the LSIs 2 to 5, placing the memory controller LSI 5 on the side of the substrate 6 as shown in FIG. 1 simplifies the arrangement of the memory bus 8 which is used for communication with the main memory 9. Another advantage of this placement of the memory controller LSI 5 is that the degree of freedom in terms of the capacity of the cache memory 30 in the processor 1 is greatly improved by increasing or decreasing the number of cache LSIs between the memory controller LSI 5 and the CPU-LSI 2.

Further, placed on the side of the heat spreader 7, the CPU-LSI 2 which generates heat more than any other LSI chips in the processor 1 is cooled surely. In addition, since the through electrodes 40 to 42 connect the CPU-LSI 2 and the memory controller LSI 5 which sandwich a plurality of cache LSIs (here, the cache LSI-A and the cache LSI-B), an increase or decrease in number of the cache LSIs does not require changing the wiring in the processor 1, and it is easy to give the processor 1 a different cache capacity and a different "way count".

This invention thus accomplishes quick cache access and effective cooling of the CPU-LSI 2 with the use of the through electrodes 40 to 42 with which information is broadcast while making it easy to give the processor 1 a varying capacity of the cache memory 30.

Figure 4:
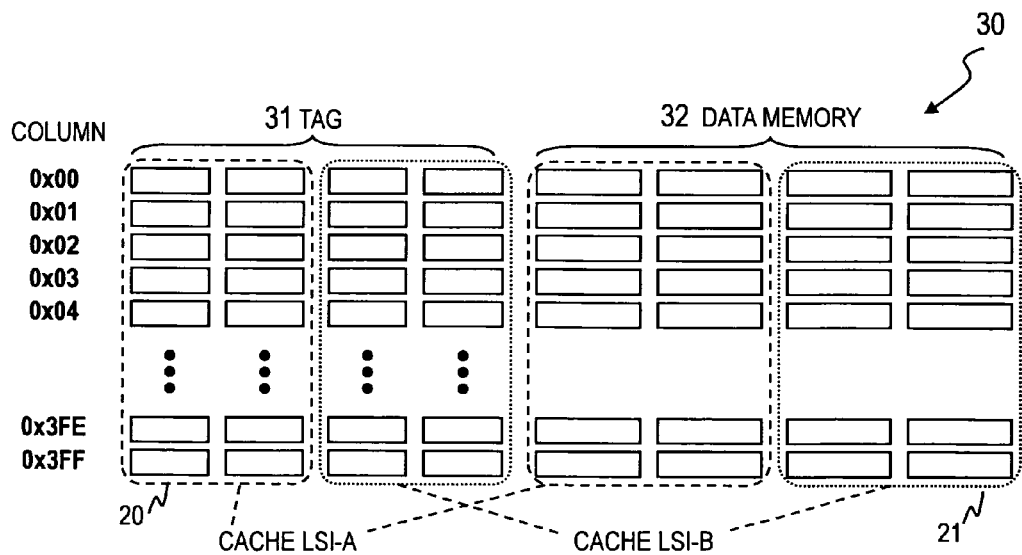
FIG. 4 is a block diagram showing another mode of storage areas of the cache memory according to the first embodiment.

The first embodiment shows an example in which the cache LSI-A and the cache LSI-B are each formed of one row, but a plurality of rows may be allocated to one cache LSI chip as shown in FIG. 4. In the example of FIG. 4, the cache LSI-A and the cache LSI-B each have two rows of cache lines, and together constitute a four-way set associative cache memory. With the per-cache LSI associativity N=2 and the cache LSI count M=2, the maximum associativity N×M is 4.

Second Embodiment

Figure 5:
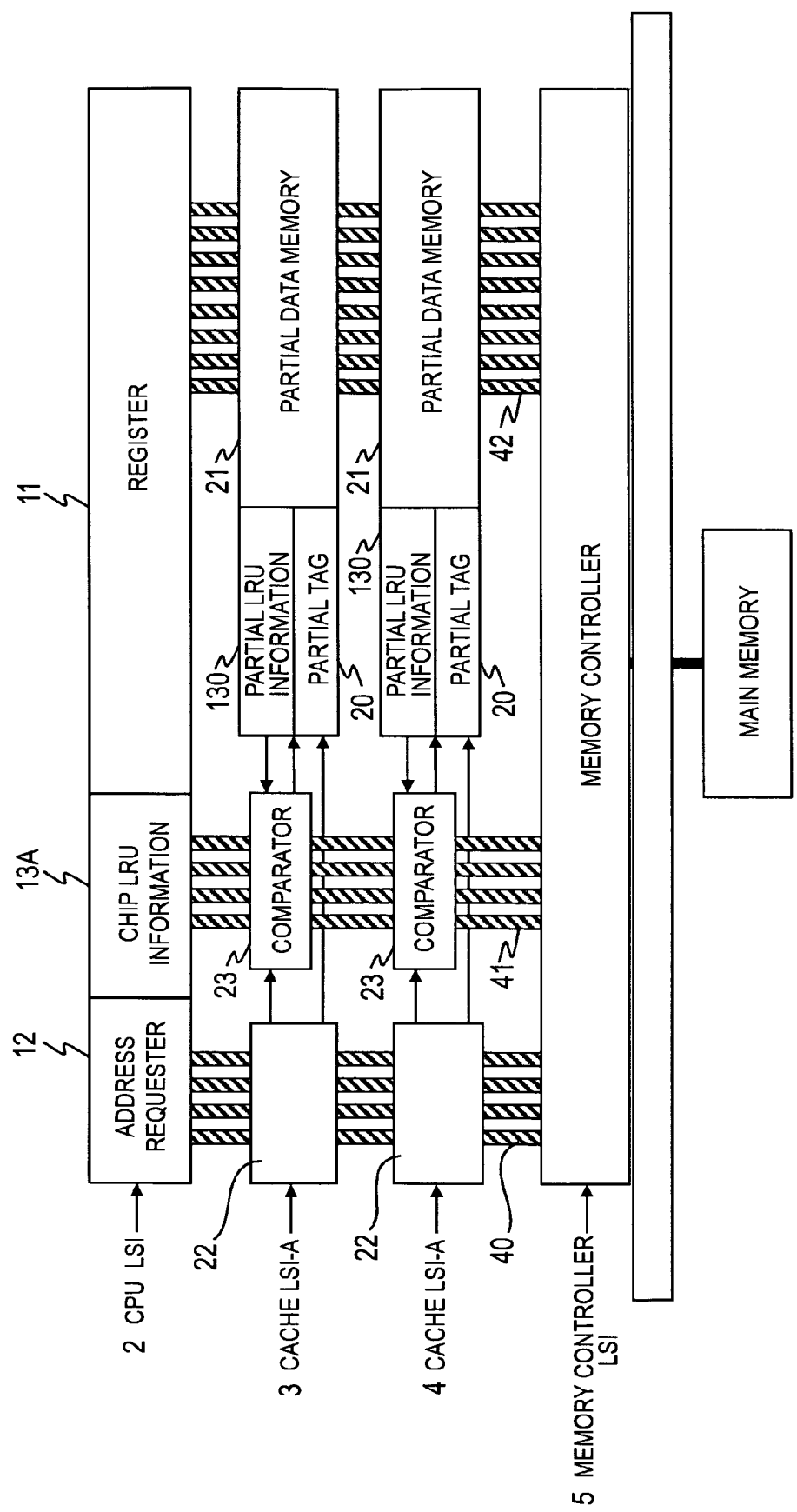
FIG. 5 is a schematic diagram in the sectional direction of a processor according to a second embodiment.

FIG. 5 is a sectional view showing important parts of the processor 1 according to a second embodiment of this invention. The second embodiment is obtained by modifying the LRU information storing unit 13 of the first embodiment. The CPU-LSI 2 of the second embodiment has, in place of the LRU information storing unit 13 of the first embodiment, a chip LRU information storing unit 13A which keeps chip LRU information for identifying which of the cache LSI-A and the cache LSI-B is available for refilling. The cache LSI-A and the cache LSI-B each have a partial LRU information storing unit 130 which keeps partial LRU information for identifying which cache line in the cache LSI is available for refilling. The rest of the second embodiment is the same as the first embodiment.

The LRU information, which is small in capacity compared to tags as mentioned above, still takes up a fair capacity when the cache LSI-A and the cache LSI-B have many cache lines. To reduce the capacity of the chip LRU information storing unit 13A in the CPU-LSI 2, the chip LRU information, which indicates which cache LSI is least used (is available for refilling), is kept in the CPU-LSI 2 and the partial LRU information, which indicates which cache line is least used (is available for refilling), is kept in each cache LSI as shown in FIG. 5.

Also, storing the partial LRU information of cache lines in the partial LRU information storing unit 130 of each cache LSI makes it possible to increase or decrease the partial LRU information storing unit 130 in capacity in concert with an increase or decrease in number of the cache LSIs.

Accordingly, the chip LRU information storing unit 13A only needs to be capable of storing chip LRU information for the maximum number of cache LSIs that can be mounted to the processor 1. The mass of the CPU-LSI 2 is thus reduced and a simpler structure is obtained.

Third Embodiment

Figure 6:
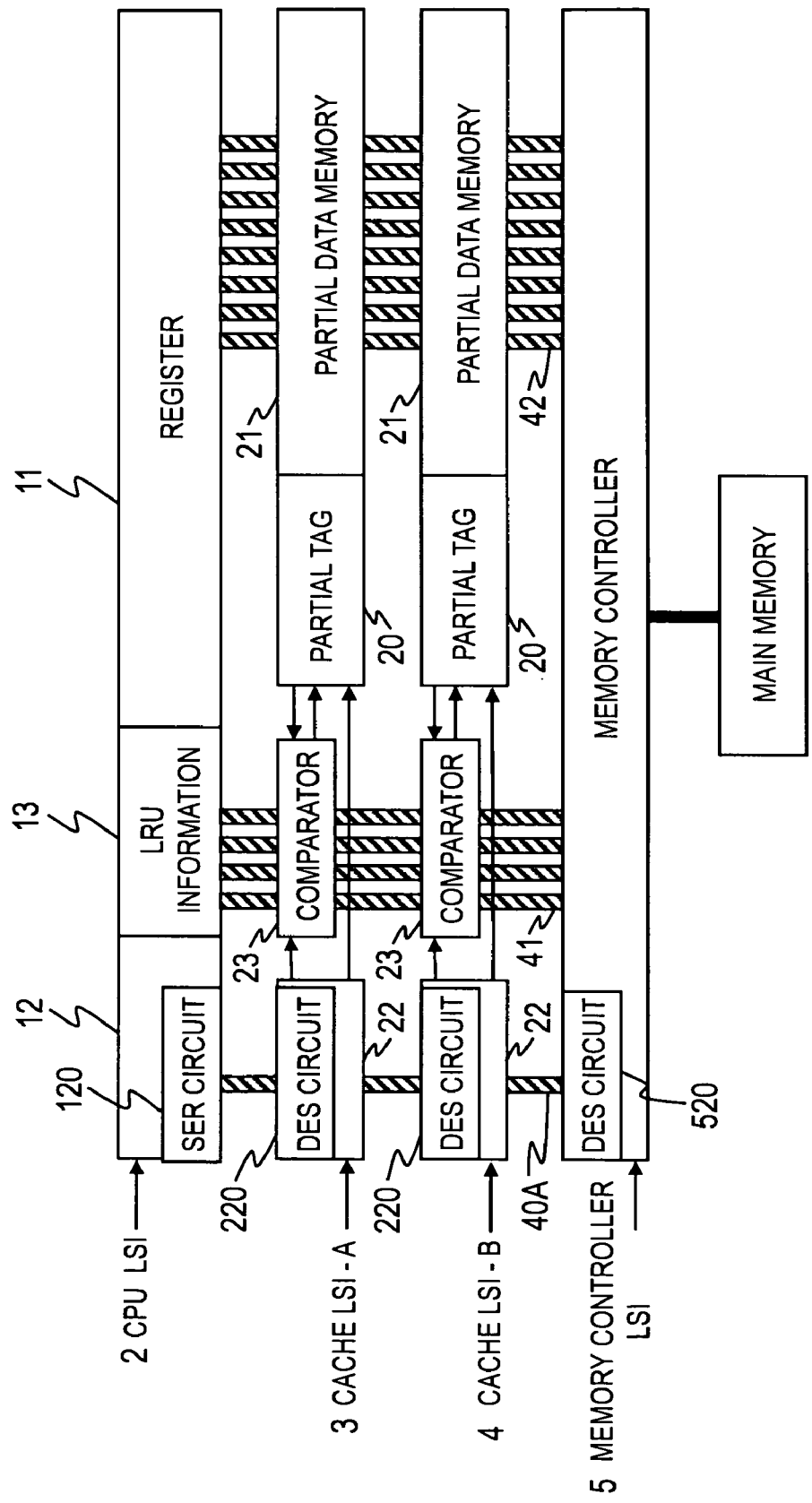
FIG. 6 is a schematic diagram in the sectional direction of a processor according to a third embodiment.

FIG. 6 is a sectional view showing important parts of the processor 1 according to a third embodiment of this invention. In the third embodiment, the through electrode 40 of the first embodiment is changed from parallel signal lines to serial signal lines, and a serial-parallel conversion circuit is added to each LSI to transfer bit string information. The address requester 12 of the CPU-LSI 2 is provided with a parallel-serial conversion circuit (serializer (SER) circuit) 120, which sends address information to a through electrode 40A formed of serial signal lines, the entry selection decoders 22 of the cache LSI-A and the cache LSI-B are each provided with a serial-parallel conversion circuit (deserializer (DES) circuit) 220, which converts serial signals of the through electrode 40A into parallel signals, and the memory controller LSI 5 is provided with a serial-parallel conversion circuit (DES circuit) 520. The rest of the third embodiment is the same as the first embodiment.

Address information has a high bit count at 32 bits or 64 bits, for example, and the through electrode 40 formed of parallel signal lines has a large circuit area. Converting address information into serial signals in the parallel-serial conversion circuit 120 of the address requester 12 and then broadcasting the converted address information to the cache LSI-A, the cache LSI-B, and the memory controller LSI 5 as shown in FIG. 6 reduces the mass of the through electrode 40A, and electrodes of the CPU-LSI 2 and the memory controller LSI 5 can be reduced in number as well. Though not shown in the drawing, the through electrode 42 for transferring data, too, can be formed from serial signal lines.

Fourth Embodiment

Figure 7:
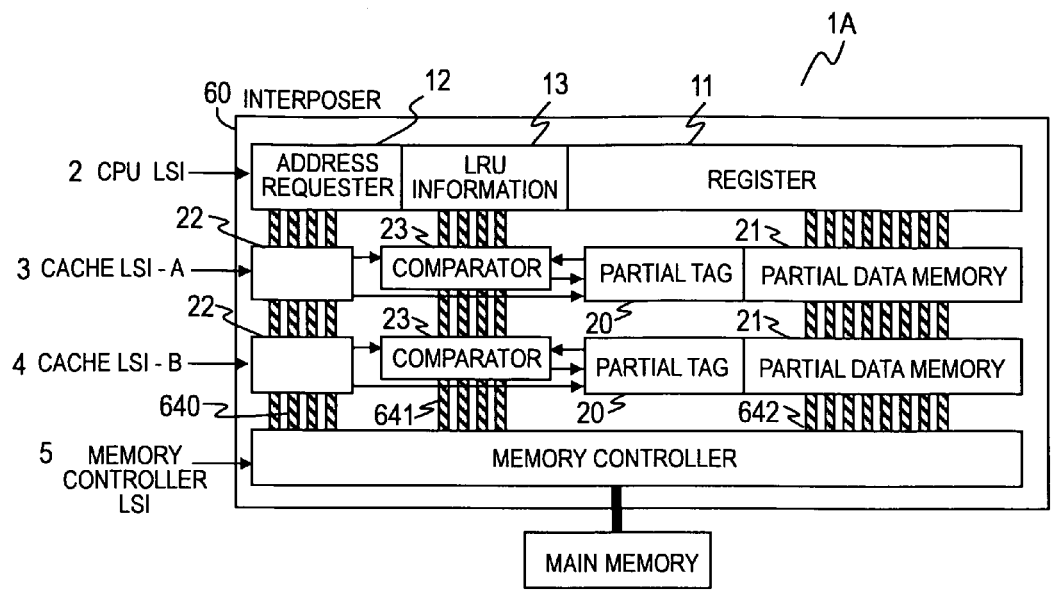
FIG. 7 is a schematic diagram in the sectional direction of a processor according to a fourth embodiment.
Figure 8:
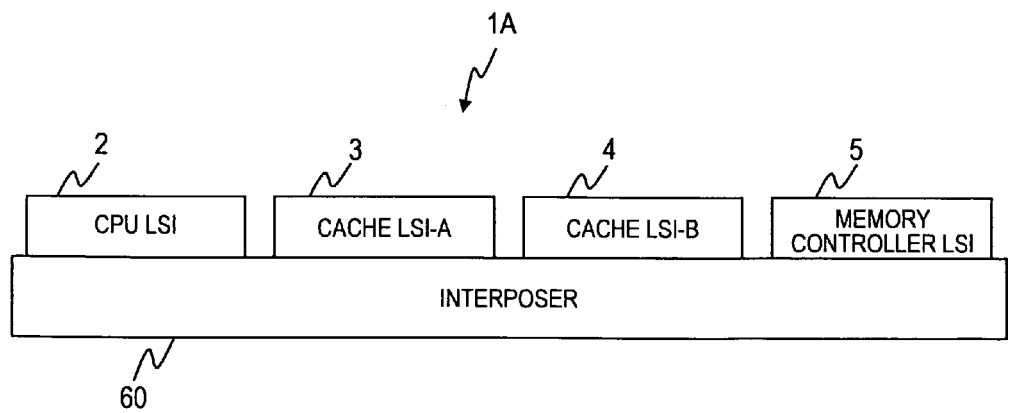
FIG. 8 is a sectional view of the processor according to the fourth embodiment.

FIGS. 7 and 8 show a fourth embodiment of this invention, and an application of SIP packaging in which the LSIs of the first embodiment are linked by a plate-like interposer 60. The structures of the LSIs 2 to 5 are the same as those in the first embodiment.

FIG. 7 is a plan view showing important parts of a processor 1A on the interposer 60. FIG. 8 is a sectional view of the processor 1A.

In FIG. 7, the LSIs are placed on the interposer 60 such that the CPU-LSI 2, the cache LSI-A, the cache LSI-B, and the memory controller LSI 5 are arranged in the stated order from top to bottom of the drawing. The LSIs 2 to 5 are disposed on the top surface of the plate-like interposer 60 as shown in FIG. 8.

Wiring lines laid on the interposer 60 replace the through electrodes of the first embodiment. Wiring 640 is used to broadcast address information from the address requester 12 to the cache LSI-A, the cache LSI-B, and the memory controller LSI 5. Wiring 641 is used to broadcast the selection signals from the LRU information storing unit 13 and the judgment signals from the tag comparators 23 to the LSIs. Wiring 642 is used to broadcast data among the register 11, the partial data memories 21 of the cache LSI-A and the cache LSI-B, and the memory controller LSI 5.

This provides the same effect as the first embodiment and low latency communication among a plurality of LSI chips is accomplished. Further, enlarging the interposer 60 and adding a new cache LSI between, for example, the cache LSI-B and the memory controller LSI 5 as in the first embodiment makes it easy to give the processor 1A a varying capacity of the cache memory 30.

Fifth Embodiment

Figure 9:
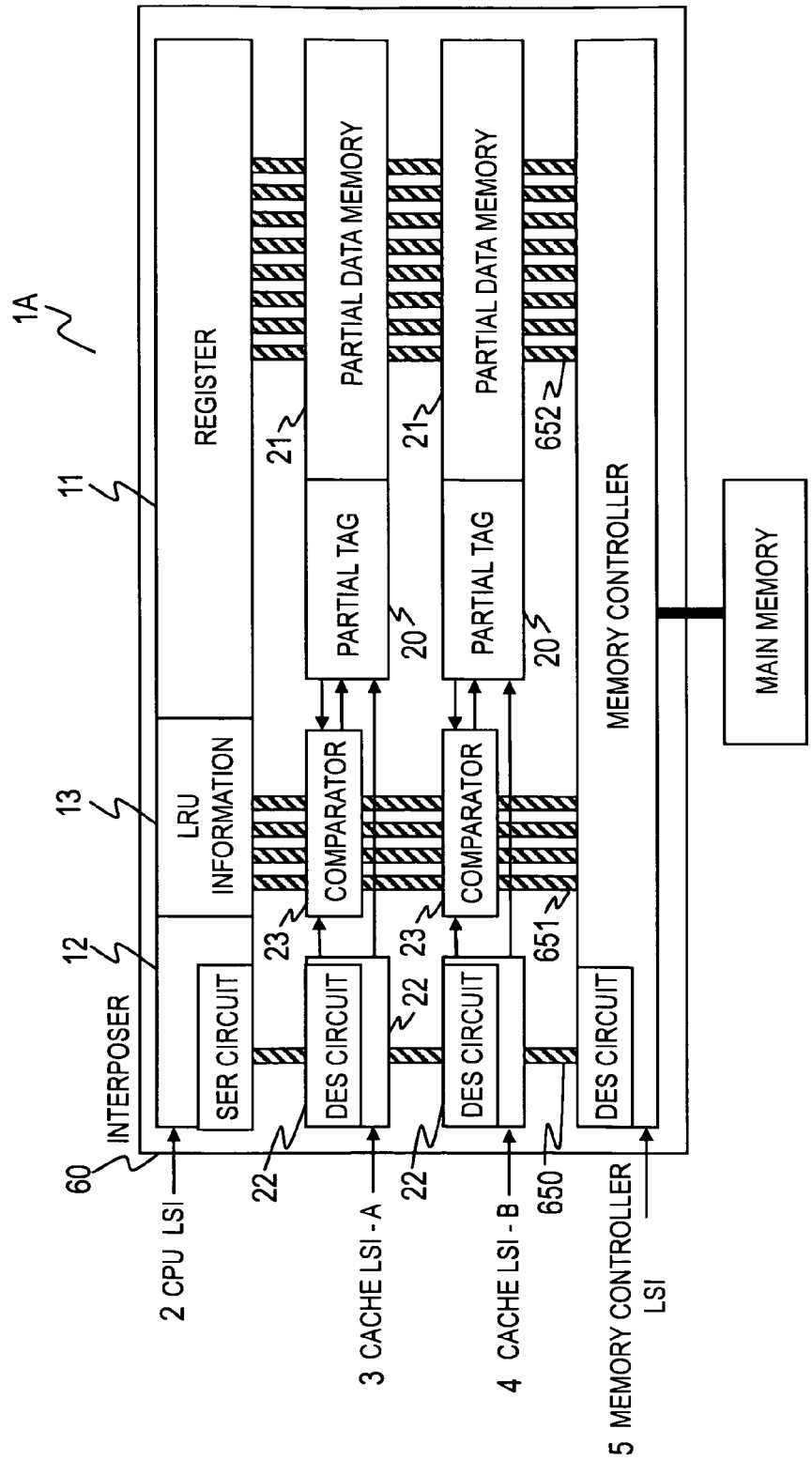
FIG. 9 is a schematic diagram in the sectional direction of a processor according to a fifth embodiment.

FIG. 9 shows a fifth embodiment of this invention, in which the serial signal lines described in the third embodiment with reference to FIG. 6 are applied to the fourth embodiment shown in FIGS. 7 and 8. The rest of the fifth embodiment is the same as that of the fourth embodiment.

In FIG. 9, the wiring 640 to the wiring 642 of the fourth embodiment are changed from parallel signal lines to serial signal lines, and a serial-parallel conversion circuit is added to each LSI. The address requester 12 of the CPU-LSI 2 is provided with the parallel-serial conversion circuit (SER circuit) 120, which sends address information to a serial signal line 650, the entry selection decoders 22 of the cache LSI-A and the cache LSI-B are each provided with the serial-parallel conversion circuit (DES circuit) 220, which converts serial signals of the serial signal line 650 into parallel signals, and the memory controller LSI 5 is provided with the serial-parallel conversion circuit (DES circuit) 520. The rest of the fifth embodiment is the same as that of the fourth embodiment.

The fifth embodiment can reduce the mass of the wiring lines and can lower the electrode count in the CPU-LSI 2 and the memory controller LSI 5 as in the third embodiment.

As has been described, this invention is applicable to a processor constituted of a plurality of LSI chips.

While the present invention has been described in detail and pictorially in the accompanying drawings, the present invention is not limited to such detail but covers various obvious modifications and equivalent arrangements, which fall within the purview of the appended claims.

What is claimed is:

1. A processor comprising:
   a first large scale integration (LSI) containing a processor that performs computing processing;
   a plurality of second large scale integrations (LSIs) each having a cache memory which stores data and address information; and
   information transmission paths connecting the first LSI to the plurality of the second LSIs,
   wherein the first LSI contains an address information issuing unit which broadcasts, to the plurality of the second LSIs, via the information transmission paths, address information of data to which access is requested by the processor,
   wherein each second LSI of the plurality of the second LSIs includes:
   a partial address information storing unit which stores a part of address information of an entire cache memory storage area;
   a partial data storing unit which stores data that is associated with the address information stored in the partial address information storing unit;
   a selection unit that selects address information to be stored in the partial address information storing unit in the second LSI from the broadcasted address information; and
   a comparison unit which compares the selected address information with the address information stored in the partial address information storing unit to judge which one of a cache hit and a cache miss occurs,
   wherein the first LSI and the plurality of the second LSIs are stacked,
   wherein the selection units of the plurality of the second LSIs are placed directly under the address information issuing unit of the first LSI,
   wherein each of the selection units is connected to the information transmission paths,
   wherein the plurality of the second LSIs are stacked on a bottom surface of the first LSI,
   wherein the information transmission paths comprise through electrodes formed in the plurality of the second LSIs, and
   wherein the plurality of the second LSIs constitutes a set associative cache memory with an N associativity, and functions, when the number of the plurality of the second LSIs is M, as a cache memory whose maximum associativity is N×M.

2. The processor according to claim 1, wherein the first LSI has a replaced line determining unit which replaces the address information and the data when the comparison unit judges that a cache miss occurs, and
   wherein, when the comparison unit judges that a cache hit occurs, the replaced line determining unit identifies in which one of the plurality of the second LSIs the cache hit occurs.

3. The processor according to claim 1, wherein the information transmission paths transmit the address information in serial signals.

4. The processor according to claim 1, further comprising a third LSI which contains a memory controller, the memory controller communicating with a main memory which is placed outside of the processor, wherein the plurality of the second LSIs are stacked between the first LSI and the third LSI.

5. The processor according to claim 4, further comprising:
a substrate which supports the third LSI; and
a heat spreader which is supported by the substrate and is in contact with the first LSI.

6. The processor according to claim 1, wherein the first LSI and the plurality of the second LSIs are linked via an interposer.

7. The processor according to claim 6, wherein the first LSI has a replaced line determining unit which replaces the address information and the data when the comparison unit judges that a cache miss occurs, and wherein, when the comparison unit judges that a cache hit occurs, the replaced line determining unit identifies in which one of the plurality of the second LSIs the cache hit occurs.

8. The processor according to claim 6, wherein the information transmission paths transmit the address information in serial signals.

9. The processor according to claim 6, wherein the information transmission paths transmit the address information in serial signals.

10. The processor according to claim 7, wherein the information transmission paths transmit the address information in serial signals.

11. A processor comprising:
a first large scale integration (LSI) containing a processor that performs computing processing;
a plurality of second large scale integrations (LSIs) each having a cache memory which stores data and address information, each second LSI of the plurality of the second LSIs including a selection unit that selects address information to be stored in the second LSI from address information of data to which access is requested by the processor as broadcasted by an address information issuing unit of the first LSI; and
information transmission paths connecting the first LSI to the plurality of the second LSIs,
wherein the processor further comprises:
a third LSI containing a memory controller which communicates with a main memory placed outside of the processor;
a substrate which supports the third LSI; and
a heat spreader which is supported by the substrate and is in contact with the first LSI, and
wherein the plurality of the second LSIs are stacked between the first LSI and the third LSI,
wherein the selection units of the plurality of the second LSIs are placed directly under the address information issuing unit of the first LSI, and
wherein each of the selection units is connected to the information transmission paths.

\* \* \* \* \*